US012377572B2

(12) United States Patent
Shindo et al.

(10) Patent No.: US 12,377,572 B2
(45) Date of Patent: Aug. 5, 2025

(54) STAPLER

(71) Applicant: Max Co., Ltd., Tokyo (JP)

(72) Inventors: Takushi Shindo, Tokyo (JP); Futoshi Kameda, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 18/678,882

(22) Filed: May 30, 2024

(65) Prior Publication Data

US 2024/0399610 A1 Dec. 5, 2024

(30) Foreign Application Priority Data

May 31, 2023 (JP) ................................ 2023-090421

(51) Int. Cl.
*B27F 7/38* (2006.01)

(52) U.S. Cl.
CPC .................................... *B27F 7/38* (2013.01)

(58) Field of Classification Search
CPC ...... B27F 7/38; B27F 7/28; B27F 7/19; B25C 5/00; B25C 5/0242
See application file for complete search history.

(56) References Cited

U.S. PATENT DOCUMENTS

| | | | | |
|---|---|---|---|---|
| 3,524,575 | A * | 8/1970 | Hurkmans | B25C 5/0228 227/123 |
| 4,366,924 | A * | 1/1983 | Leiter | B25C 5/0207 227/155 |
| 4,623,082 | A * | 11/1986 | Kurosawa | B27F 7/36 206/338 |
| 4,844,319 | A * | 7/1989 | Kurosawa | B27F 7/19 227/79 |
| 6,050,471 | A | 4/2000 | Yagi | |
| 2010/0096430 | A1* | 4/2010 | Sugihara | B27F 7/19 227/155 |
| 2019/0315013 | A1* | 10/2019 | Sugihara | B27F 7/21 |
| 2020/0139528 | A1* | 5/2020 | Kameda | B25C 5/0207 |

FOREIGN PATENT DOCUMENTS

| | | |
|---|---|---|
| JP | H10-180710 A | 7/1998 |

* cited by examiner

*Primary Examiner* — Anna K Kinsaul
*Assistant Examiner* — Nicholas E Igbokwe
(74) *Attorney, Agent, or Firm* — Banner & Witcoff, Ltd.

(57) ABSTRACT

A stapler includes: a forming plate configured to shape a staple; a face plate provided at a position to be face the staple; and a feeding portion configured to feed a staple sheet. The forming plate includes a first shaping portion that is configured to shape one leg portion of the staple and a second shaping portion that is configured to shape another leg portion thereof. The second shaping portion is configured to retract from a position facing the face plate after the first shaping portion retracts from the position facing the face plate after shaping.

7 Claims, 12 Drawing Sheets

STAPLER

CROSS-REFERENCE TO RELATED APPLICATIONS

This application is based on and claims priority under 35 USC § 119 from Japanese Patent Application No. 2023-090421 filed on May 31, 2023, the contents of which are incorporated herein by reference.

TECHNICAL FIELD

The present disclosure relates to a stapler that binds a bundle of sheets with a staple.

BACKGROUND ART

There has been proposed a stapler including a staple pusher (feeding portion) that presses connected staples (staple sheet) to which linear staples (linear staples) are bonded in parallel toward a front end plate (face plate), a forming plate that shapes the linear staple into a gate shape (U-shape), and a driver that moves up and down in conjunction with the forming plate and drives out the staple shaped by the forming plate (for example, see Patent Literature 1).

In such a stapler, when the forming plate is lowered, the forming plate protrudes to the feeding path of the staple to shape the staple. Further, when the forming plate is raised, both of a portion for shaping one side of a straight staple and a portion for shaping the other side of the straight staple in the forming plate are simultaneously retracted from the feeding path of the staple, and when the staple sheet is fed, the shaped staple is moved to a position at which the staple can be driven out by the driver.

Patent Literature 1: JPH10-180710A

When the forming plate with which the staple is shaped retracts from the feeding path of the staple sheet, a straight staple positioned immediately behind the shaped staple in the staple sheet fed by the feeding portion comes into contact with the face plate to generate collision sound. At this time, since both of the portion for shaping the one side of the straight staple and the portion for shaping the other side of the straight staple in the forming plate are simultaneously retracted from the feeding path of the staple, and the staple sheet is pressed by a staple pusher in a direction of the face plate, the collision sound is generated at both end portion sides of the straight staple positioned immediately behind the shaped staple, that is, at both portions corresponding to the one side and the other side of the staple before shaping in the straight staple positioned immediately behind the shaped staple.

In view of the above, the present disclosure provides a stapler capable of reducing sound generated when a staple sheet comes into contact with a face plate.

SUMMARY OF INVENTION

The present disclosure discloses a stapler including: a forming plate configured to shape a leading staple of a staple sheet, which is formed by connecting a plurality of staples extending linearly in a direction perpendicular to an axial direction of the staples, into a U-shape, when viewed from a connection direction of the staples; a face plate provided at a position to be face the leading staple in the connection direction; and a feeding portion configured to, after the leading staple is shaped, feed the staple sheet in the connection direction, and configured to bring a linear staple positioned immediately behind the shaped staple into contact with the face plate. The forming plate includes a first shaping portion that is configured to shape one leg portion of the staple forming a part of the U-shape and a second shaping portion that is configured to shape another leg portion thereof forming another part of the U-shape. The first shaping portion is configured to be insertable and removable at a position facing the face plate, configured to shape the one leg portion by bending a part of the leading staple by being inserted at the position facing the face plate, and configured to retract from the position facing the face plate after shaping. The second shaping portion is configured to be insertable and removable at the position facing the face plate, and configured to shape the other leg portion by bending another part of the leading staple by being inserted at the position facing the face plate, and configured to retract from the position facing the face plate after the first shaping portion retracts from the position facing the face plate after shaping.

The first shaping portion is configured to shape the one leg portion by bending a part of the leading staple by being inserted at the position facing the face plate, and configured to retract from the position facing the face plate after shaping. The second shaping portion is configured to shape the other leg portion by bending another part of the leading staple by being inserted at the position facing the face plate, and configured to retract from the position facing the face plate after the first shaping portion retracts from the position facing the face plate after shaping.

The second shaping portion retracts from the position facing the face plate after the first shaping portion retracts from the position facing the face plate, so that after one end portion side of the staple along the axial direction of the staple positioned immediately behind the shaped staple comes into contact with the face plate, the other end portion side of the staple comes into contact with the face plate. That is, a timing at which the face plate is brought into contact with the one end portion side to generate sound is different from a timing at which the face plate is brought into contact with the other end portion side to generate sound. As a result, it is possible to reduce the generated sound as compared with a case where sound is generated when the one end portion side and the other end portion side along the axial direction of the staple come into contact with the face plate at the same timing.

DESCRIPTION OF EMBODIMENTS

Hereinafter, an embodiment of a stapler according to the present disclosure will be described with reference to the drawings.

Configuration Example of Stapler of Present Embodiment

Figure 1A:
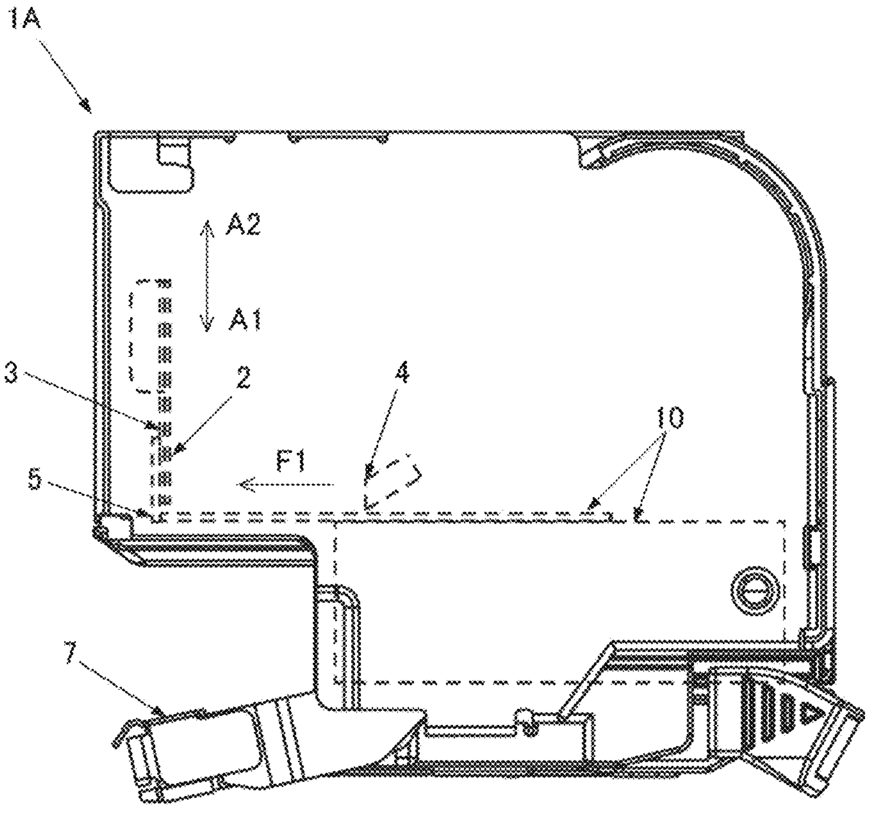
FIG. 1A is a side view illustrating an example of a stapler according to a first embodiment.
Figure 1B:
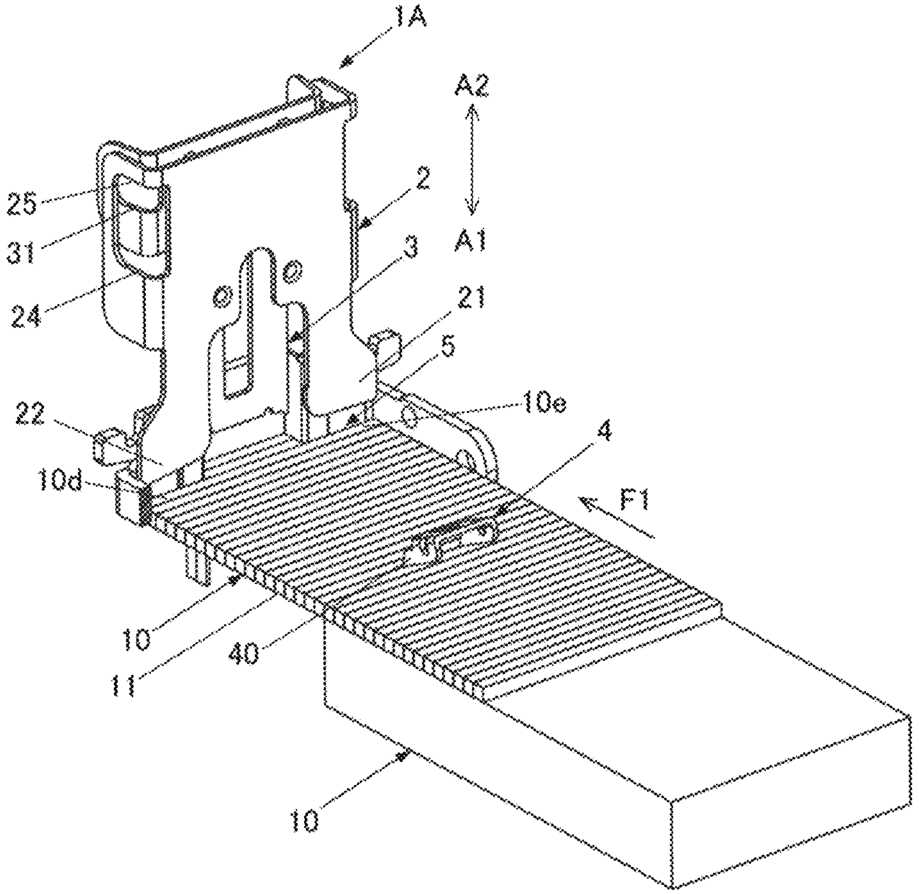
FIG. 1B is a perspective view illustrating the example of the stapler according to the first embodiment.
Figure 1C:
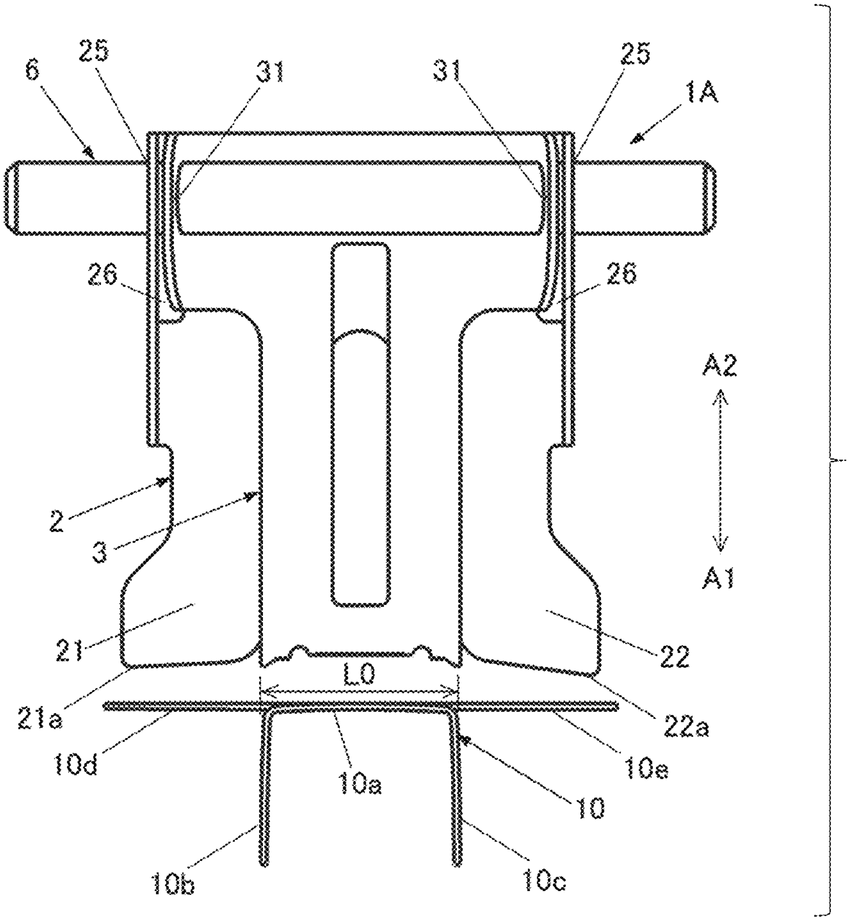
FIG. 1C is a front view illustrating the example of the stapler according to the first embodiment.
Figure 1D:
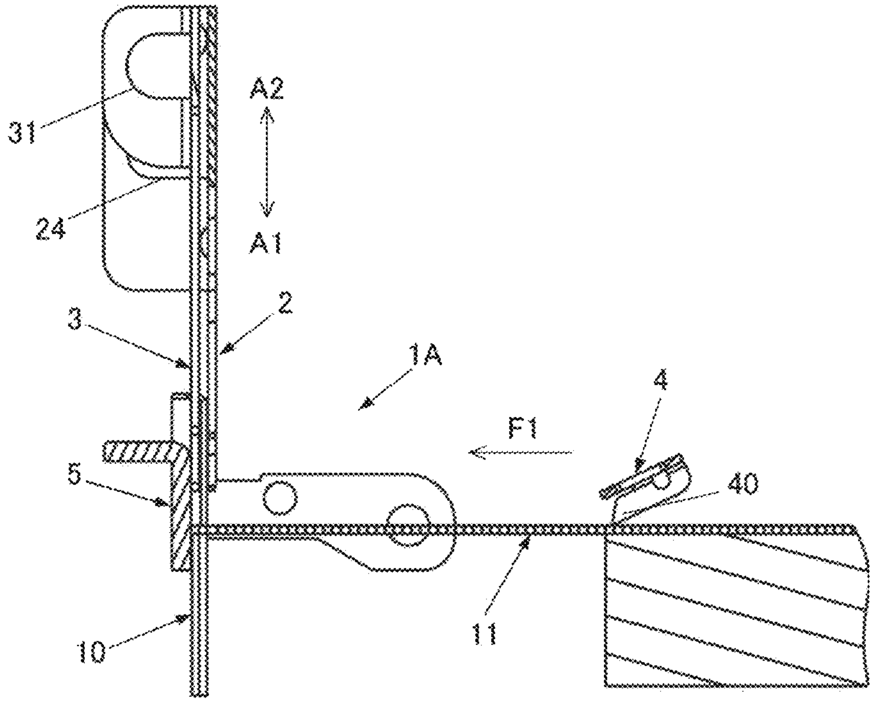
FIG. 1D is a side sectional view illustrating the example of the stapler according to the first embodiment.

FIG. 1A is a side view illustrating an example of a stapler according to a first embodiment, FIG. 1B is a perspective view illustrating the example of the stapler according to the first embodiment, FIG. 1C is a front view illustrating the example of the stapler according to the first embodiment, and FIG. 1D is a side sectional view illustrating the example of the stapler according to the first embodiment.

A stapler 1A includes a forming plate 2 for shaping the staple 10 and a driver plate 3 for driving out a staple 10 shaped by the forming plate 2. Further, the stapler 1A includes a feeding portion 4 that feeds a staple sheet 11 to which a plurality of staples 10 are connected, and a face plate 5 with which the staple sheet 11 fed by the feeding portion 4 comes into contact. The stapler 1A further includes a bending portion 7 that bends a first staple foot 10*b*, which is one leg portion, and a second staple foot 10*c*, which is the other leg portion, of the staple 10 driven out by a driver. The forming plate 2 shapes a leading staple 10 of the staple sheet 11, which is formed by connecting a plurality of staples 10 extending linearly in a direction orthogonal to an axial direction of the staples 10, into a U-shape (U shape or gate shape), when viewed from a connection direction of the staples 10. The face plate 5 is provided at a position facing the leading staple 10 in the connection direction of the staples 10. The leading staple 10 facing the face plate 5 is the staple 10 before being shaped by the forming plate 2. The face plate 5 is provided at least at a position facing the leading staple 10 before being shaped. After the leading staple 10 is shaped, the feeding portion 4 feeds the staple sheet 11 in the connection direction of the staple 10, and brings the linear staple 10 positioned immediately behind the shaped staple 10 into contact with the face plate 5.

By shaping the staple 10 using the forming plate 2, a first staple foot (leg portion) 10*b* bent in a first direction indicated by an arrow A1 is formed on one end portion of a staple crown 10*a*, and a second staple foot (leg portion) 10*c* bent in the first direction is formed on the other end portion of the staple crown 10*a*. The above-described form of the shaped staple 10 is referred to as a U-shape.

In the staple 10 before shaping, the axial direction extending linearly is a longitudinal direction, and a direction orthogonal to the axial direction is a short direction.

In the staple 10 before shaping, a predetermined length range thereof from one end portion in the longitudinal direction is shaped by the forming plate 2 to become the first staple foot 10*b*. In the staple 10 before shaping, a range to be the first staple foot 10*b* is referred to as a first staple foot formation portion 10*d*. In addition, in the staple 10 before shaping, a predetermined length range thereof from the other end portion in the longitudinal direction is shaped by the forming plate 2 to become the second staple foot 10*c*. In the staple 10 before shaping, a range to be the second staple foot 10*c* is referred to as a second staple foot formation portion 10*e*.

In the staple sheet 11, the plurality of staples 10 before shaping are lined up along the short direction orthogonal to the axial direction, and are separably connected by adhesion or the like.

A cartridge (not illustrated) accommodating the plurality of stacked staple sheets 11 is removably loaded into the stapler 1A.

Figure 2A:
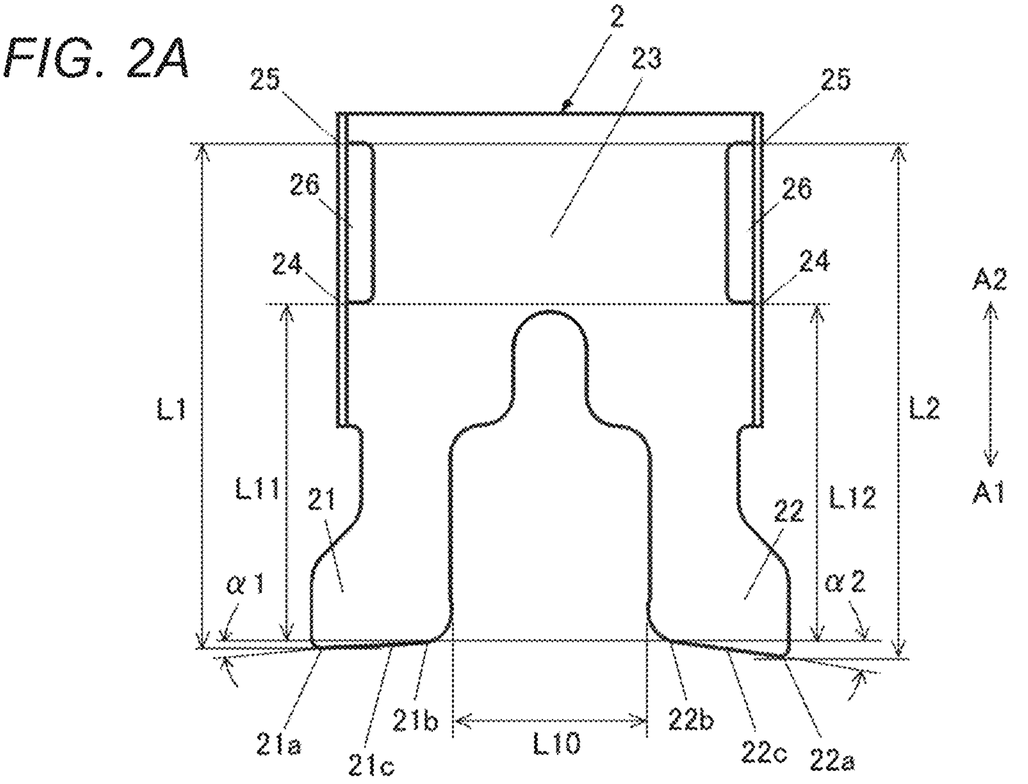
FIG. 2A is a front view illustrating an example of a forming plate.
Figure 2B:
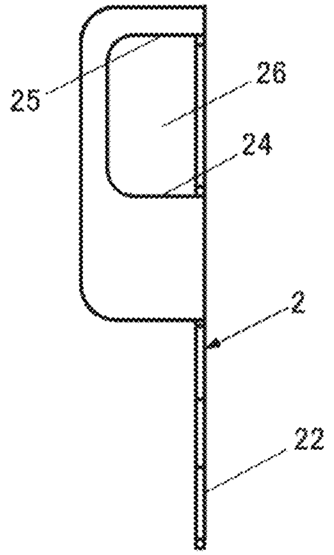
FIG. 2B is a side view illustrating the example of the forming plate.

FIG. 2A is a front view illustrating an example of the forming plate, and FIG. 2B is a side view illustrating the example of the forming plate.

The forming plate 2 is supported so as to be movable in a first direction indicated by the arrow A1 and a second direction indicated by an arrow A2 opposite to the first direction, which are substantially orthogonal to a feeding direction of the staple sheet 11 indicated by an arrow F1 (FIG. 1*i*). As described above, the first direction is a direction in which the first staple foot 10*b* and the second staple foot 10*c* are bent with respect to the staple crown 10*a*.

The forming plate 2 includes a first shaping portion 21 that shapes the first staple foot 10*b* of the staple 10, a second shaping portion 22 that shapes the second staple foot 10*c*, and a connecting portion 23 that connects the first shaping portion 21 and the second shaping portion 22.

The forming plate 2 includes a first action portion 24 that receives a force for moving in the first direction indicated by the arrow A1, and a second action portion 25 that receives a force for moving in the second direction indicated by the arrow A2.

The first shaping portion 21 is configured to be insertable and removable at the position facing the face plate 5 by moving the forming plate 2 in the first direction and the second direction. The position facing the face plate 5 is a position facing the face plate 5 in a part facing a staple 10 before being shaped to be described later, that is, a position facing the face plate 5 in a feeding path of the staple sheet 11 (the staple 10). When the face plate 5 has a shape extending along the first direction and the second direction, the first shaping portion 21 moves in the first direction to be inserted into the position facing the face plate 5 at a portion facing the staple 10 before being shaped. The first shaping portion 21 is configured to be inserted into the position facing the face plate 5 to bend a part of the leading staple 10 to shape the first staple foot 10*b*, and move in the second direction after shaping the staple 10 to retreat from the position facing the face plate 5. The second shaping portion 22 is configured to be insertable and removable at the position facing the face plate 5 by moving the forming plate 2 in the first direction and the second direction. When the face plate 5 has a shape extending along the first direction and the second direction, the second shaping portion 22 moves in the first direction to be inserted into the position facing the face plate 5 at a portion facing the staple 10 before being shaped. The second shaping portion 22 is configured to be inserted into the position facing the face plate 5 to bend another part of the leading staple 10 to shape the second staple foot 10*c*, and move in the second direction after shaping the staple 10 to retreat from the position facing the face plate 5. Accordingly, by moving the forming plate 2 in the first direction, the first shaping portion 21 and the second shaping portion 22 protrude to a feeding path of the staple sheet 11 fed by the feeding portion 4. When the forming plate 2 moves in the second direction, the first shaping portion 21 and the second shaping portion 22 retreat from the feeding path of the staple sheet 11.

In the forming plate 2, the first shaping portion 21 and the second shaping portion 22 protrude from the connecting portion 23 in the first direction at an interval corresponding to an outer width L0 (FIG. 1C) of the staple crown 10*a*. The outer width L0 of the staple crown 10*a* is a length from an outer side of the first staple foot 10*b* of the staple 10 to an outer side of the second staple foot 10*c*.

In the first shaping portion 21, a first front end portion 21*a* that protrudes the most in the first direction is formed in an outer end portion on a side opposite to a side facing the second shaping portion 22. In addition, in the first shaping portion 21, a first rear end portion 21*b* recessed in the second direction from the first front end portion 21*a* is formed in an inner end portion facing the second shaping portion 22.

In the second shaping portion 22, a second front end portion 22*a* that protrudes most in the first direction is formed in an outer end portion on a side opposite to a side facing the first shaping portion 21. In addition, in the second shaping portion 22, a second rear end portion 22*b* recessed in the second direction from the second front end portion 22*a* is formed on an inner end portion facing the first shaping portion 21.

The second shaping portion 22 is configured such that a length of the second shaping portion 22 along an insertion and removal direction in which the second shaping portion 22 is inserted and removed at the position facing the face plate 5 is longer than a length of the first shaping portion 21 in the insertion and removal direction. In the present embodiment, the length of the first shaping portion 21 along the insertion and removal direction is a length from the second action portion 25 to the first front end portion 21*a* in the first direction. The length of the second shaping portion 22 along the insertion and removal direction is a length from the second action portion 25 to the second front end portion 22*a* along the first direction.

A length L2 along the first direction from the second action portion 25 to the second front end portion 22*a* of the second shaping portion 22 is longer than a length L1 along the first direction from the second action portion 25 to the first front end portion 21*a* of the first shaping portion 21. Accordingly, the second shaping portion 22 is configured such that, when the forming plate 2 moves in the second direction, the first front end portion 21*a* of the first shaping portion 21 retracts from the position facing the face plate 5, and then the second front end portion 22*a* retracts from the position facing the face plate 5.

The forming plate 2 is configured such that a length L11 to the first rear end portion 21*b* of the first shaping portion 21 and a length L12 to the second rear end portion 22*b* of the second shaping portion 22 are equal.

The length L11 of the first shaping portion 21 to the first rear end portion 21*b* is a length along the first direction from the first action portion 24 to the first rear end portion 21*b*. The length L12 of the second shaping portion 22 to the second rear end portion 22*b* is a length along the first direction from the first action portion 24 to the second rear end portion 22*b*.

In the first shaping portion 21, a first front end surface 21*c* which is a front end portion connecting the first front end portion 21*a* and the first rear end portion 21*b* is inclined in an insertion direction from an inner side toward the outside. The first front end surface 21*c* forms an inclined surface of the first shaping portion 21. In the second shaping portion 22, a second front end surface 22*c* which is a front end portion connecting the second front end portion 22*a* and the second rear end portion 22*b* is inclined in the insertion direction from the inner side toward the outside. The second front end surface 22*c* forms an inclined surface of the second shaping portion 22. The inclined surface of the first shaping portion 21 has an inclination angle different from that of the inclined surface of the second shaping portion 22. That is, the forming plate 2 is configured such that an inclination angle $\alpha 2$ of the second front end surface 22*c* connecting the second front end portion 22*a* and the second rear end portion 22*b* of the second shaping portion 22 is larger than an inclination angle $\alpha 1$ of the first front end surface 21*c* connecting the first front end portion 21*a* and the first rear end portion 21*b* of the first shaping portion 21. The first rear end portion 21*b*, which is at a rear end position of the inclined surface of the first shaping portion 21 in the insertion and removal direction, is set at the same or substantially the same position as the second rear end portion 22*b*, which is at a rear end position of the inclined surface of the second shaping portion 22 in the insertion and removal direction.

In the forming plate 2, long hole portions 26 extending along the first direction and the second direction are formed in one side portion on a side where the first shaping portion 21 is formed and the other side portion on a side where the second shaping portion 22 is formed. The first action portion 24 is formed of a surface at an end portion of the long hole portion 26 in the first direction. The second action portion 25 is formed of a surface at an end portion of the long hole portion 26 in the second direction.

Next, the driver plate 3, the feeding portion 4, and the face plate 5 will be described with reference to FIGS. 1B, IC, and ID.

The driver plate 3 is provided downstream of the forming plate 2 in the feeding direction of the staple sheet 11 indicated by the arrow F1. The driver plate 3 is provided with respect to the forming plate 2 with a gap corresponding to one width of the staple 10 in the short direction. The driver plate 3 is supported so as to be movable independently of the forming plate 2 in the first direction substantially orthogonal to the feeding direction of the staple sheet 11 and the second direction opposite to the first direction. The driver plate 3 is configured to be insertable into and removable from the feeding path of the staple sheet 11 including the staple crown 10*a*, and is configured to come into contact with the staple crown 10*a* by being inserted into the feeding path of the staple sheet 11 to drive out the staple 10, and to retract from the feeding path of the staple sheet 11 after the staple 10 is driven out.

The driver plate 3 includes action portions 31 that receive a force for moving in the first direction and a force for moving in the second direction. The action portion 31 is a hole having a shape formed by combining a semicircular shape and a quadrangular shape.

The stapler 1A includes a shaft 6 that moves the forming plate 2 and the driver plate 3 in the first direction and the second direction. The shaft 6 is an example of a transmission member, and is driven by a drive portion (not illustrated) including a motor, a gear, and the like, and moves in the first direction and the second direction. The shaft 6 is inserted into the long hole portion 26 of the forming plate 2 and the action portion 31 of the driver plate 3.

The action portion 31 of the driver plate 3 includes a hole having a shape formed by combining a semicircular portion having a diameter substantially equal to a diameter of the shaft 6 and a quadrangular portion connected to the semi-circular portion. Accordingly, the driver plate 3 follows a movement of the shaft 6 in the first direction and the second direction.

In contrast, a length of the long hole portion 26 of the forming plate 2 in the longitudinal direction along the first direction and the second direction is longer than the diameter of the shaft 6. Accordingly, when the shaft 6 moving in the first direction comes into contact with the first action portion 24, the forming plate 2 moves in the first direction in conjunction with the driver plate 3. In addition, when the shaft 6 moving in the second direction comes into contact with the second action portion 25, the forming plate 2 moves in the second direction in conjunction with the driver plate 3. Further, when the shaft 6 is not in contact with any of the first action portion 24 and the second action portion 25, the forming plate 2 is not interlocked with the driver plate 3 and is in a stopped state.

The feeding portion 4 feeds the staple sheet 11 in the direction of the arrow F1 by moving a claw portion 40 engaged with the staple sheet 11 in the direction of the arrow F1. The feeding portion 4 may be configured to be urged by an urging member such as a spring (not illustrated), or may be configured to be driven by a drive portion (not illustrated) including a motor, a gear, and the like.

The face plate 5 is provided downstream of the forming plate 2 and the driver plate 3 in the feeding direction of the staple sheet 11 indicated by the arrow F1. The face plate 5 closes the feeding path of the staple sheet 11 by the feeding portion 4, and comes into contact with the first staple foot formation portion 10*d* and the second staple foot formation portion 10*e* of the staple 10 before shaping.

Figure 3A:
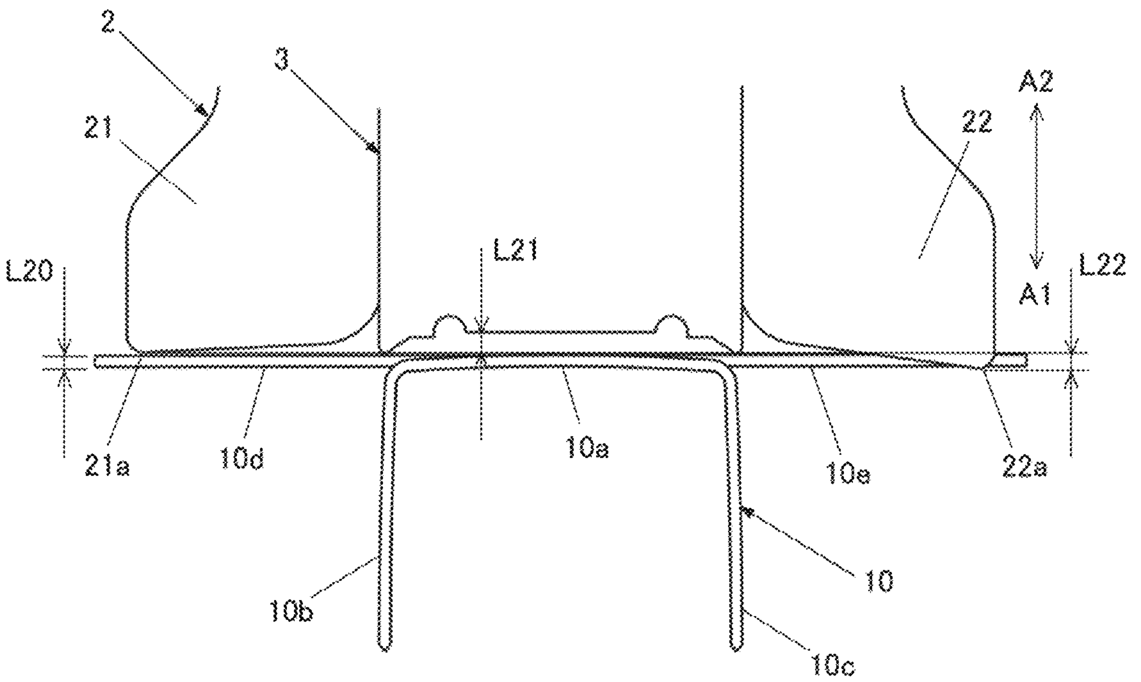
FIG. 3A is a front view illustrating a relationship between the forming plate and a driver plate and a dimension of a staple.
Figure 3B:
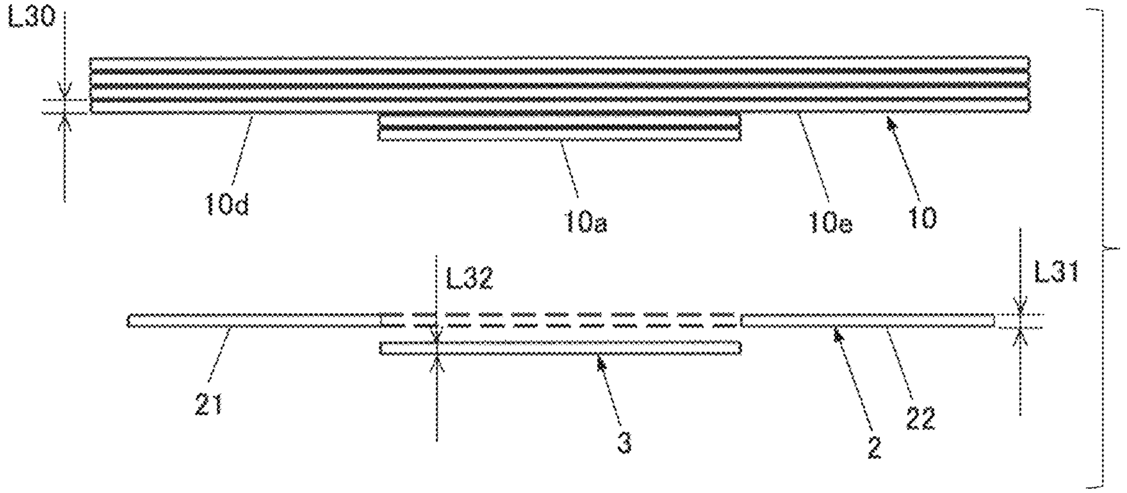
FIG. 3B is a top view illustrating the relationship between the forming plate and the driver plate and the dimension of the staple.
Figure 3C:
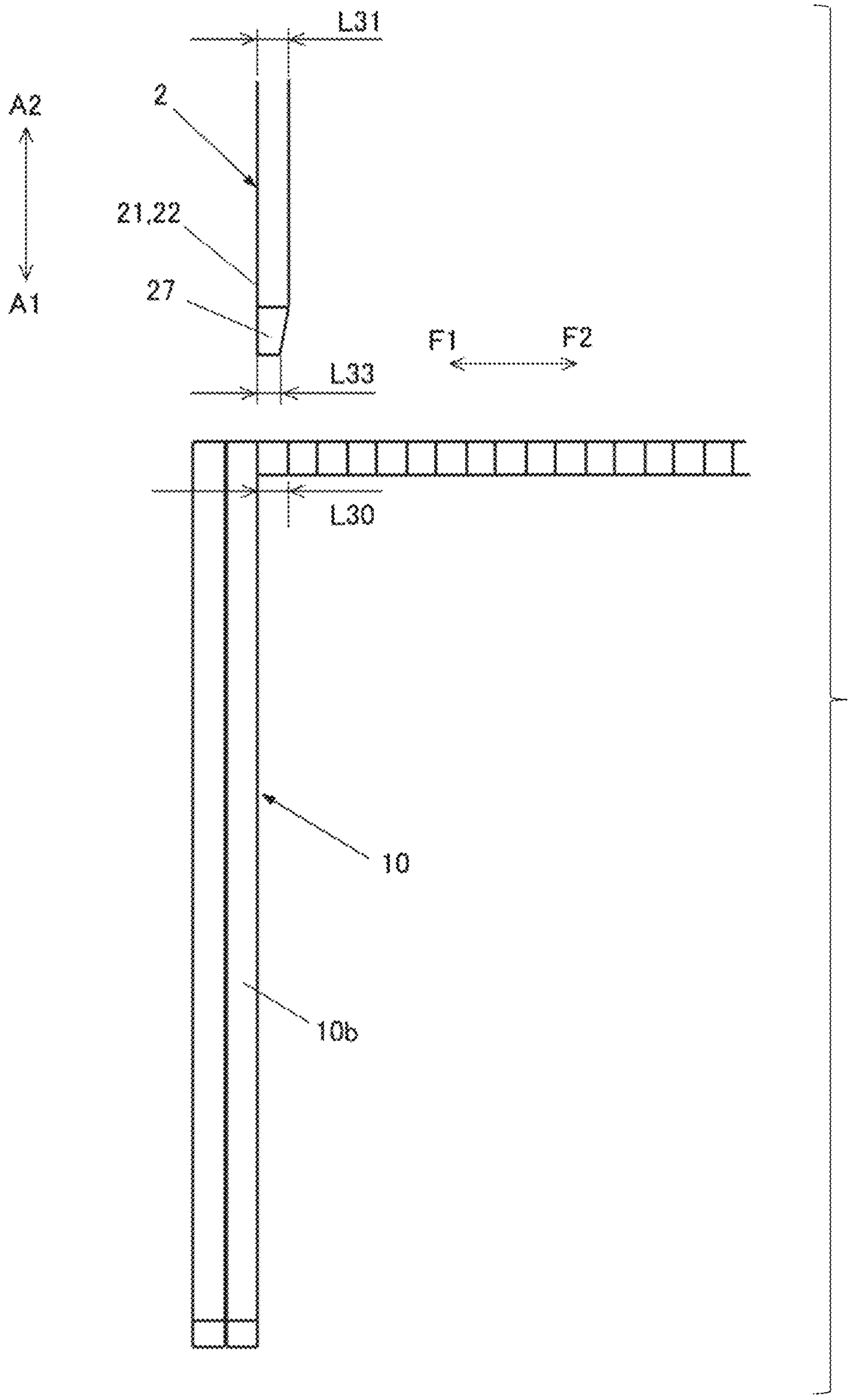
FIG. 3C is a side view illustrating a relationship between the forming plate and the dimension of the staple.

FIG. 3A is a front view illustrating a relationship between the forming plate and the driver plate and the dimension of the staple, FIG. 3B is a top view illustrating the relationship between the forming plate and the driver plate and the dimension of the staple, and FIG. 3C is a side view illustrating a relationship between the forming plate and the dimension of the staple.

A thickness L20 of the staple 10 illustrated in FIG. 3A is about 0.35 mm in this example. In contrast, a length L22 by which the second front end portion 22*a* of the second shaping portion 22 protrudes in the first direction with respect to the first front end portion 21*a* of the first shaping portion 21 is about 0.5 mm. This dimensional difference is set so that the second shaping portion 22 remains in the feeding path of the staple sheet 11 at a timing at which the first shaping portion 21 retreats from the feeding path of the staple sheet 11.

A length L21 by which the driver plate 3 retreats in the second direction with respect to the first front end portion 21*a* of the first shaping portion 21 is about 1 mm. This dimensional difference is set so that the driver plate 3 retracts from the feeding path of the staple sheet 11 before the timing at which the first shaping portion 21 retracts from the feeding path of the staple sheet 11.

A width L30 of the staple 10 illustrated in FIGS. 3B and 3C is about 0.5 mm in this example. In contrast, thicknesses L31 of the first shaping portion 21 and the second shaping portion 22 of the forming plate 2 is each about 0.5 mm. This dimension is for shaping one staple 10 with the forming plate 2. A thickness L32 of the driver plate 3 is about 0.5 mm. This dimension is for driving out one staple 10 by the driver plate 3. Further, the first shaping portion 21 and the second shaping portion 22 of the forming plate 2 have a tapered shape in which a rear side is narrowed toward the first direction as indicated by the arrow F2, and a thickness L33 of a tip end portion 27 is about 0.4 mm. This dimension is intended to prevent the forming plate 2 from being caught on the staple 10 before shaping, behind the staple 10 to be shaped.

Configuration Example of Stapler of Present Embodiment

Figure 4A:
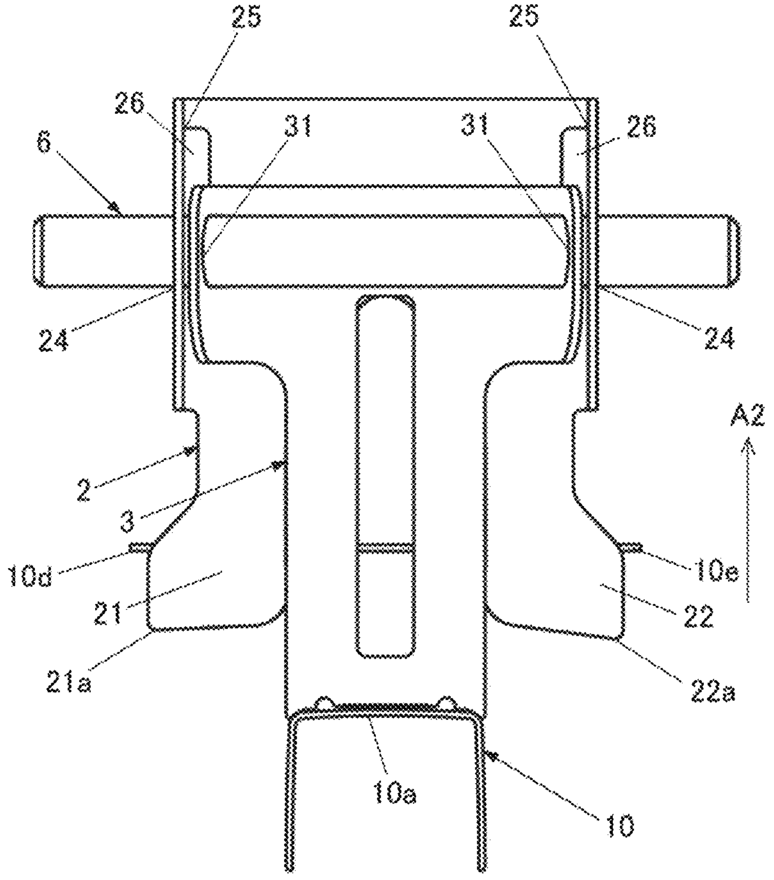
FIG. 4A is a front view illustrating an example of an operation of the stapler according to the first embodiment.
Figure 4B:
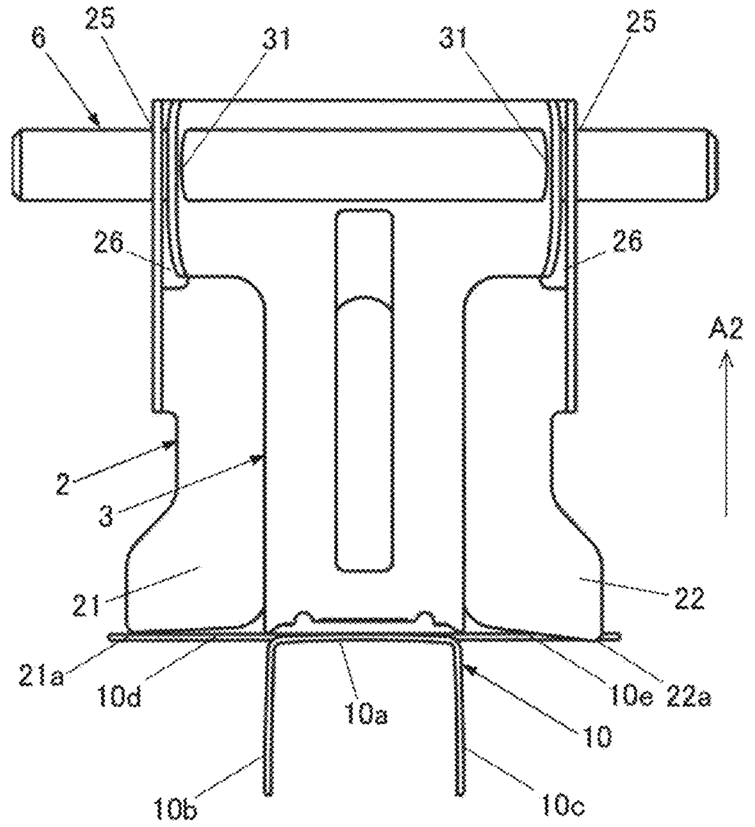
FIG. 4B is a front view illustrating the example of the operation of the stapler according to the first embodiment.
Figure 4C:
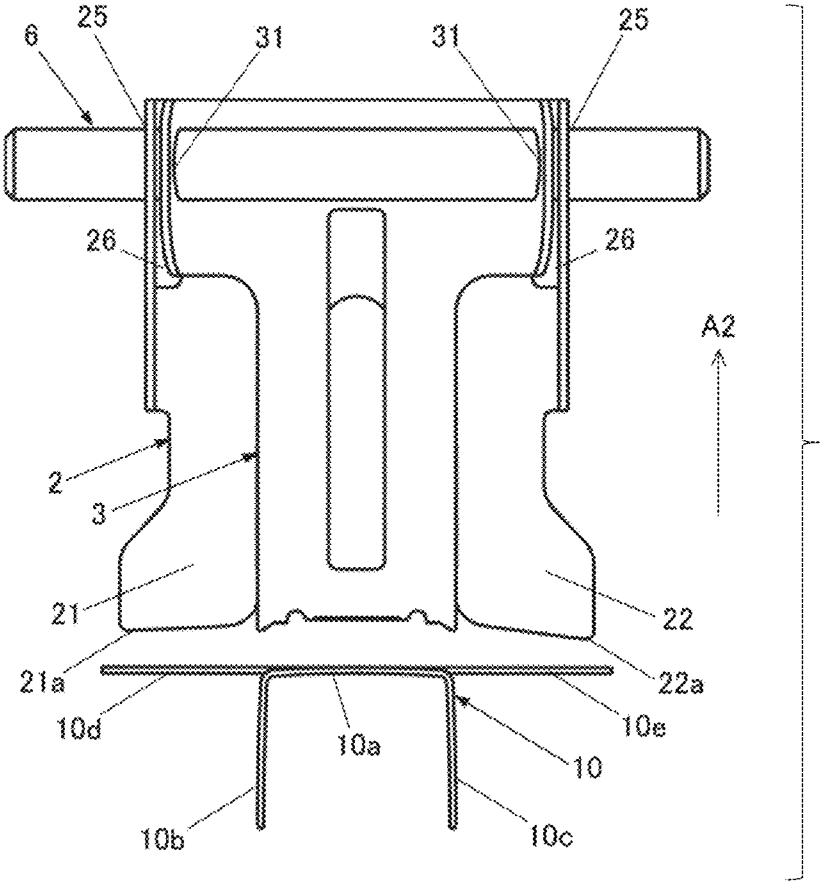
FIG. 4C is a front view illustrating the example of the operation of the stapler according to the first embodiment.
Figure 5A:
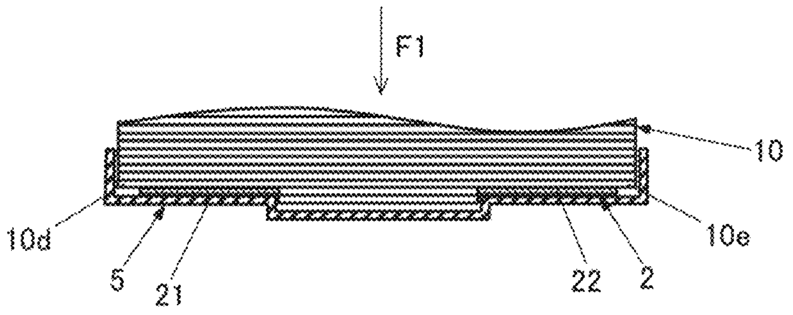
FIG. 5A is a top sectional view illustrating the example of the operation of the stapler according to the first embodiment.
Figure 5B:
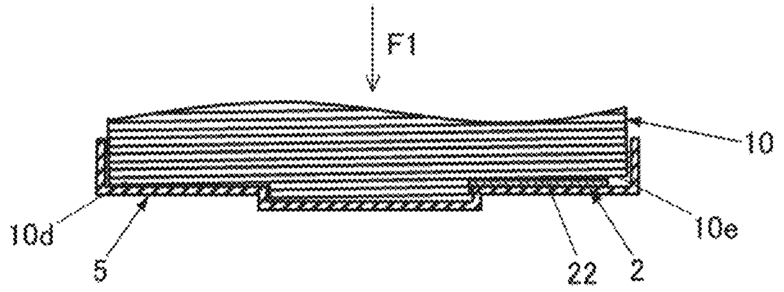
FIG. 5B is a top sectional view illustrating an example of the operation of the stapler according to the first embodiment.
Figure 5C:
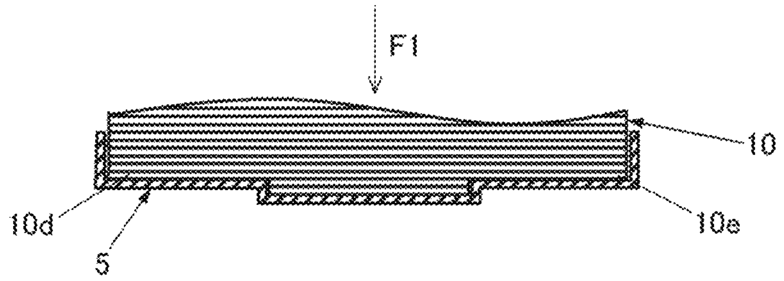
FIG. 5C is a top sectional view illustrating the example of the operation of the stapler according to the first embodiment.

FIGS. 4A, 4B, and 4C are front views illustrating an example of an operation of the stapler according to the first embodiment. FIGS. 5A, 5B, and 5C are top sectional views illustrating an example of the operation of the stapler according to the first embodiment.

When the shaft 6 is driven by the drive portion (not illustrated) to move in the first direction, the driver plate 3 receives the force for moving the driver plate 3 in the first direction by the action portion 31. When the driver plate 3 moves in the first direction in a state where the shaped staple 10 positioned at the head of the staple sheet 11 is positioned, the shaped staple 10 is driven out in a movement path of the driver plate 3.

When the shaft 6 moving in the first direction comes into contact with the first action portion 24, the forming plate 2 moves in the first direction in conjunction with the driver plate 3.

The forming plate 2 is configured such that the length L2 to the second front end portion 22*a* of the second shaping portion 22 is longer than the length L1 to the first front end portion 21*a* of the first shaping portion 21. When the forming plate 2 moves in the first direction from a standby position, the second shaping portion 22 first comes into contact with the second staple foot formation portion 10*e* of the staple 10 before shaping due to the difference in length between the first shaping portion 21 and the second shaping portion 22. When the forming plate 2 moves in the first direction from this state, the second staple foot formation portion 10*e* of the staple 10 is bent in the first direction.

When the forming plate 2 moves in the first direction to a position where the second staple foot formation portion 10*e* of the staple 10 is bent in the first direction by a predetermined amount, the first shaping portion 21 comes into contact with the first staple foot formation portion 10*d* of the staple 10 before shaping. When the forming plate 2 moves in the first direction from this state, the first staple foot formation portion 10*d* is bent in the first direction in addition to the second staple foot formation portion 10*e* of the staple 10.

In this manner, timings at which the first staple foot formation portion 10*d* and the second staple foot formation portion 10*e* of the staple 10 start to be bent can be shifted from each other based on the difference in length between the first shaping portion 21 and the second shaping portion 22 of the forming plate 2, and a load applied to the forming plate 2 can be distributed.

When the forming plate 2 moves to a shaping position in the first direction, the first shaping portion 21 and the second shaping portion 22 protrude to the feeding path of the staple sheet 11. Accordingly, in the forming plate 2, the first shaping portion 21 enters between the face plate 5 and the first staple foot formation portion 10*d* of the staple 10 before shaping, and the second shaping portion 22 enters between the face plate 5 and the second staple foot formation portion 10*e* of the staple 10 before shaping.

The forming plate 2 is configured such that the length L11 to the first rear end portion 21*b* of the first shaping portion 21 and the length L12 to the second rear end portion 22*b* of the second shaping portion 22 are equal. Accordingly, a timing at which the first staple foot 10*b* finishes bending with respect to the staple crown 10*a* coincides with a timing at which the second staple foot 10*c* finishes bending with respect to the staple crown 10*a*, and symmetry of a forming shape is maintained.

When the shaft 6 is driven by the drive portion (not illustrated) to move in the second direction, the driver plate 3 receives the force for moving the driver plate 3 in the second direction by the action portion 31. When the driver plate 3 moves in the second direction, the driver plate 3 separates from the staple 10 driven into a sheet (not illustrated).

When the shaft 6 moving in the second direction comes into contact with the second action portion 25, the forming plate 2 moves in the second direction in conjunction with the driver plate 3.

When the forming plate 2 moves by a predetermined amount in the second direction from the shaping position, the first shaping portion 21 and the second shaping portion 22 retract from the position facing the face plate 5 of the portion facing the staple 10 before being shaped after a timing at which the driver plate 3 retracts from the feeding path of the staple sheet 11. In the forming plate 2, the first shaping portion 21 first retracts from the feeding path of the staple sheet 11 based on the difference in length between the first shaping portion 21 and the second shaping portion 22. In the forming plate 2, the second shaping portion 22 remains in the feeding path of the staple sheet 11 at the timing at which the first shaping portion 21 retreats from the feeding path of the staple sheet 11.

In this state, when the staple sheet 11 is fed in the direction of the arrow F1 by the feeding portion 4, the first staple foot formation portion 10*d* of the staple 10 before shaping approaches the face plate 5. Alternatively, the first staple foot formation portion 10*d* of the staple 10 before shaping may come into contact with the face plate 5. When the first staple foot formation portion 10*d* comes into contact with the face plate 5, sound (collision sound) is generated when the first staple foot formation portion 10*d* comes into contact with the face plate 5. On the other hand, the second staple foot formation portion 10*e* of the staple 10 before shaping is held in contact with the second shaping portion 22 of the forming plate 2.

When the forming plate 2 moves to the standby position in the second direction, the second shaping portion 22 retreats from the feeding path of the staple sheet 11.

In this state, when the staple sheet 11 is fed in the direction of the arrow F1 by the feeding portion 4, the second staple foot formation portion 10*e* of the staple 10 before shaped positioned immediately behind the shaped staple 10 comes into contact with the face plate 5. This generates sound (collision sound) when the second staple foot formation portion 10*e* comes into contact with the face plate 5. When the first staple foot formation portion 10*d* of the staple 10 before shaped comes into contact with the face plate 5 first at the timing at which the second staple foot formation portion 10*e* of the staple 10 before shaped comes into contact with the face plate 5, the first staple foot formation portion 10*d* of the staple 10 before shaped is held in contact with the face plate 5, and generation of sound (collision sound) is reduced. Accordingly, a timing of generating sound is dispersed. In addition, when the first staple foot formation portion 10*d* of the staple 10 before shaping approaches the face plate 5 before the second staple foot formation portion 10*e* of the staple 10 before shaping, the first staple foot formation portion 10*d* of the staple 10 before shaping comes into contact with the face plate 5 before the timing at which the second staple foot formation portion 10*e* of the staple 10 before shaping comes into contact with the face plate 5. Accordingly, the timing of generating sound is dispersed. Regarding the staple crown 10*a* of the shaped staple 10 positioned at the head of the staple sheet 11, a side close to the first staple foot 10*b* first comes into contact with the face plate 5, and then a side close to the second staple foot 10*c* comes into contact with the face plate 5.

As described above, since the timing of generating the sound is dispersed, it is possible to reduce the generated sound (collision sound) as compared with a case where sound is generated when the first staple foot formation portion 10*d* and the second staple foot formation portion 10*e* of the staple 10 before shaping come into contact with the face plate 5 at the same timing.

Figure 6A:
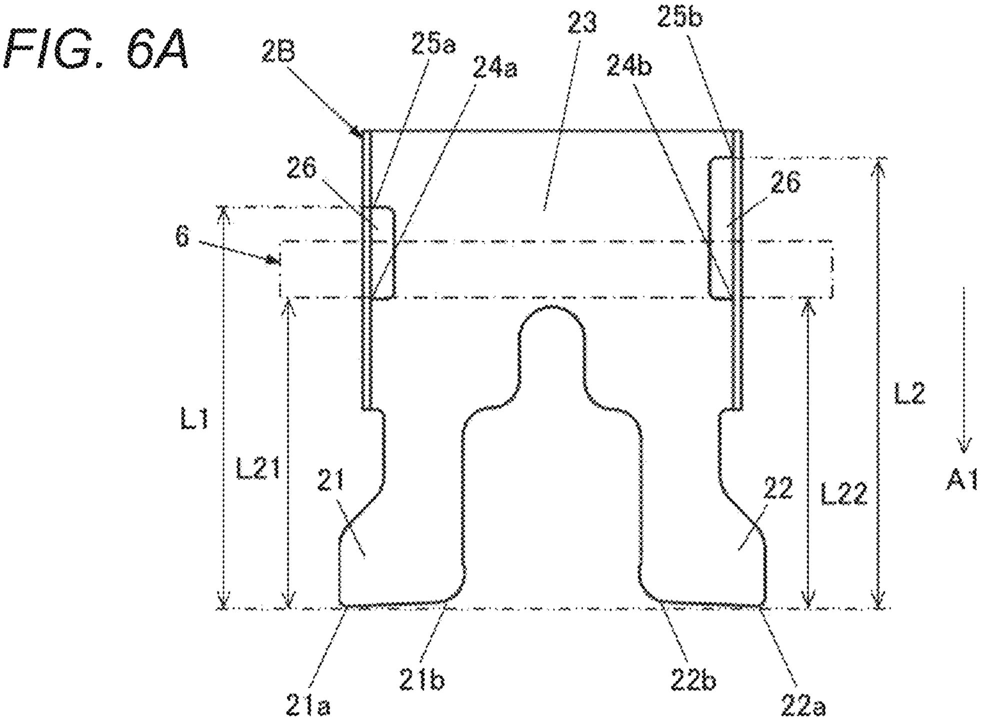
FIG. 6A is a front view illustrating a modification of the forming plate.
Figure 6B:
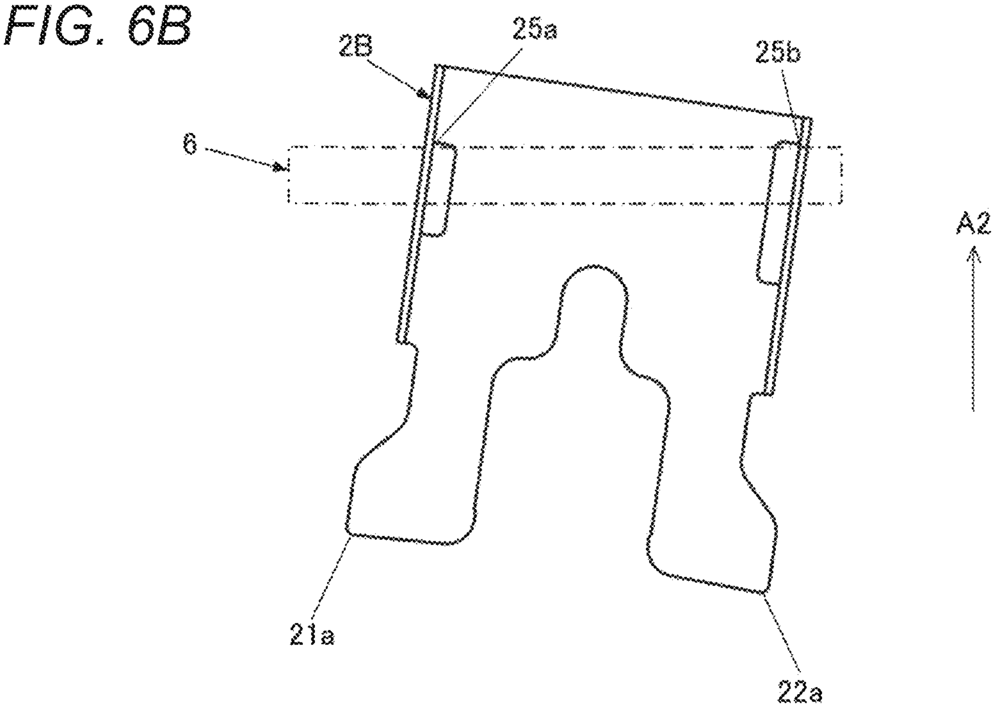
FIG. 6B is a front view illustrating the modification of the forming plate.

FIGS. 6A and 6B are front views illustrating a modification of the forming plate. A forming plate 2B is supported so as to be movable in the first direction indicated by the arrow A1 and the second direction indicated by the arrow A2 opposite to the first direction.

The forming plate 2B includes the first shaping portion 21 that shapes the first staple foot 10*b* of the staple 10 illustrated in FIG. 1B and the like, the second shaping portion 22 that shapes the second staple foot 10*c*, and the connecting portion 23 that connects the first shaping portion 21 and the second shaping portion 22.

The forming plate 2B includes first action portions 24*a* and 24*b* that receive a force for moving in the first direction indicated by the arrow A1, and second action portions 25*a* and 25*b* that receive a force for moving in the second direction indicated by the arrow A2.

In the forming plate 2B, the first shaping portion 21 and the second shaping portion 22 have symmetrical shapes, and a protruding length from the first rear end portion 21*b* of the first shaping portion 21 to the first front end portion 21*a* is equal to a protruding length from the second rear end portion 22*b* of the second shaping portion 22 to the second front end portion 22*a*.

The forming plate 2B is configured such that the length L21 from the first action portion 24*a* on the side where the first shaping portion 21 is provided to the first front end portion 21*a* of the first shaping portion 21 is equal to the length L22 from the first action portion 24*b* on the side where the second shaping portion 22 is provided to the second front end portion 22*a* of the second shaping portion 22.

In contrast, the forming plate 2B is configured such that the length L2 from the second action portion 25*b* on the side where the second shaping portion 22 is provided to the second front end portion 22*a* of the second shaping portion 22 is longer than the length L1 from the second action portion 25*a* on the side where the first shaping portion 21 is provided to the first front end portion 21*a* of the first shaping portion 21.

In the forming plate 2B, when the shaft 6 moves in the first direction, the shaft 6 comes into contact with the first action portion 24*a* on the side where the first shaping portion 21 is provided and the first action portion 24*b* on the side where the second shaping portion 22 is provided at substantially the same timing. When the shaft 6 further moves in the first direction from this state, the first shaping portion 21 and the second shaping portion 22 come into contact with the staple (not illustrated in FIGS. 6A and 6B) at substantially the same timing. When the forming plate 2B moves to the shaping position in the first direction from this state, the staple is shaped.

In the forming plate 2B, when the shaft 6 moves in the second direction, first, the shaft 6 comes into contact with the second action portion 25*a* on the side where the first shaping portion 21 is provided. When the shaft 6 further moves in the second direction from this state, the forming plate 2B moves in the second direction on the side where the first shaping portion 21 is provided. Accordingly, the forming plate 2B is rotatably supported along the face plate illustrated in FIG. 1A and the like, and the first front end portion 21*a* of the first shaping portion 21 is more inclined in the second direction than the second front end portion 22*a* of the second shaping portion 22.

In the forming plate 2B, when the shaft 6 further moves in the second direction, the shaft 6 comes into contact with the second action portion 25*b* on the side where the second shaping portion 22 is provided. When the shaft 6 further moves in the second direction from this state, the forming plate 2B moves in the second direction in the state where the first shaping portion 21 is more inclined in the second direction than the second shaping portion 22.

Accordingly, when the forming plate 2B moves in the second direction from the shaping position, the timing at which the second shaping portion 22 retracts from the feeding path of the staple sheet and the timing at which the first shaping portion 21 retracts from the feeding path of the staple sheet are shifted from each other. Accordingly, the timing at which the sound is generated when one end portion side of the staple along the longitudinal direction comes into contact with the face plate illustrated in FIG. 1A or the like can be made different from the timing at which the sound is generated when the other end portion side of the staple along the longitudinal direction comes into contact with the face plate. As a result, it is possible to reduce an increase in sound as compared with a case in which sound is generated when the one end portion side and the other end portion side along the longitudinal direction of the staple come into contact with the face plate at the same timing.

What is claimed is:

1. A stapler comprising:

a forming plate configured to shape a leading staple of a staple sheet, which is formed by connecting a plurality of staples extending linearly in a direction perpendicular to an axial direction of the staples, into a U-shape, when viewed from a connection direction of the staples;

a face plate provided at a position to face the leading staple in the connection direction; and a feeding portion configured to, after the leading staple is shaped, feed the staple sheet in the connection direction, and configured to bring a linear staple positioned immediately behind the shaped staple into contact with the face plate, wherein the forming plate includes a first shaping portion that is configured to shape one leg portion of the staple forming a part of the U-shape and a second shaping portion that is configured to shape another leg portion thereof forming another part of the U-shape, the first shaping portion is configured to be insertable and removable at a position facing the face plate, configured to shape the one leg portion by bending a part of the leading staple by being inserted at the position facing the face plate, and configured to retract from the position facing the face plate after shaping, and the second shaping portion is configured to be insertable and removable at the position facing the face plate, and configured to shape the other leg portion by bending another part of the leading staple by being inserted at the position facing the face plate, and configured to retract from the position facing the face plate after the first shaping portion retracts from the position facing the face plate after shaping.

2. The stapler according to claim 1, wherein the second shaping portion is formed such that a length thereof along an insertion and removal direction is longer than a length of the first shaping portion along the insertion and removal direction.

3. The stapler according to claim 2, wherein the first shaping portion and the second shaping portion each have an inclined surface whose front end portion is inclined outward in an insertion direction, and the inclined surface of the first shaping portion has an inclination angle different from that of the inclined surface of the second shaping portion.

4. The stapler according to claim 3, wherein a rear end position of the inclined surface of the first shaping portion in the insertion and removal direction is set at the same or substantially the same position as a rear end position of the inclined surface of the second shaping portion in the insertion and removal direction.

5. The stapler according to claim 1, wherein the forming plate is rotatably supported along the face plate facing thereto, and is configured to be rotated so that the first shaping portion retracts earlier than the second shaping portion after the leg portions are shaped.

6. The stapler according to claim 1, further comprising a driver plate configured to drive out the staple by pressing in a crown portion of the staple shaped into the U-shape by the forming plate, wherein the driver plate is configured to be insertable into and removable from a feeding path of the staple when the crown portion is pressed in, and configured to come into contact with the crown portion by being inserted into the feeding path to drive out the staple and configured to retract from the feeding path after the staple is driven out, and the first shaping portion and the second shaping portion are configured to retract from the position facing the face plate after the driver plate retracts from the feeding path.

7. The stapler according to claim 1, wherein the position facing the face plate is a position facing the face plate in a feeding path of the staple.

* * * * *